United States Patent
Basson et al.

(10) Patent No.: US 7,076,429 B2
(45) Date of Patent: Jul. 11, 2006

(54) METHOD AND APPARATUS FOR PRESENTING IMAGES REPRESENTATIVE OF AN UTTERANCE WITH CORRESPONDING DECODED SPEECH

(75) Inventors: Sara H. Basson, White Plains, NY (US); Dimitri Kanevsky, Ossining, NY (US); Jeffrey Scott Sorensen, Seymour, CT (US)

(73) Assignee: International Business Machines Corporation, Armonk, NY (US)

( * ) Notice: Subject to any disclaimer, the term of this patent is extended or adjusted under 35 U.S.C. 154(b) by 709 days.

(21) Appl. No.: 09/844,120

(22) Filed: Apr. 27, 2001

(65) Prior Publication Data

US 2002/0161582 A1     Oct. 31, 2002

(51) Int. Cl.
*G10L 21/00*   (2006.01)

(52) U.S. Cl. ............ 704/272; 704/271; 704/275; 704/270

(58) Field of Classification Search ......... 704/270.1, 704/270, 231, 235, 257, 271, 275–277; 348/515; 345/473, 719; 434/185
See application file for complete search history.

(56) References Cited

U.S. PATENT DOCUMENTS

| | | | |
|---|---|---|---|
| 5,649,060 A | | 7/1997 | Ellozy et al. |
| 5,880,788 A | * | 3/1999 | Bregler ................ 348/515 |
| 5,884,267 A | * | 3/1999 | Goldenthal et al. ...... 704/270.1 |
| 6,006,175 A | | 12/1999 | Holzrichter |
| 6,101,264 A | | 8/2000 | Wagner et al. |
| 6,250,928 B1 | * | 6/2001 | Poggio et al. ............. 434/185 |
| 6,256,046 B1 | * | 7/2001 | Waters et al. ............ 345/473 |
| 6,317,716 B1 | * | 11/2001 | Braida et al. ............. 704/275 |
| 6,421,453 B1 | | 7/2002 | Kanevsky et al. |
| 6,442,518 B1 | * | 8/2002 | Van Thong et al. ........ 704/235 |
| 6,580,437 B1 | * | 6/2003 | Liou et al. ................ 345/719 |
| 2002/0133340 A1 | | 9/2002 | Basson et al. |

* cited by examiner

*Primary Examiner*—Abul Azad
*Assistant Examiner*—Huyen X. Vo
(74) *Attorney, Agent, or Firm*—Ryan, Mason & Lewis, LLP (57) ABSTRACT

Apparatus for presenting images representative of one or more words in an utterance with corresponding decoded speech includes, in one aspect, a visual detector for capturing images of body movements (e.g., lip and/or mouth movements) corresponding to the one or more words in the utterance coupled to a visual feature extractor. The visual feature extractor receives time information from an automatic speech recognition (ASR) system and operatively processes the captured images from the visual detector to generate one or more image segments based on the time information relating to one or more decoded words in the utterance, each image segment corresponding to a decoded word in the utterance. An image player coupled to the visual feature extractor presents an image segment with a corresponding decoded word. The image segment may be presented as an animation of successive images in time, whereby a user is provided multiple sources of information for comprehending the utterance and can more easily ascertain the relationship between the body movements and the corresponding decoded speech.

19 Claims, 6 Drawing Sheets

METHOD AND APPARATUS FOR PRESENTING IMAGES REPRESENTATIVE OF AN UTTERANCE WITH CORRESPONDING DECODED SPEECH

FIELD OF THE INVENTION

The present invention relates generally to speech recognition, and more particularly relates to improved techniques for enhancing automatic speech recognition (ASR) by presenting images representative of an utterance with corresponding decoded speech.

BACKGROUND OF THE INVENTION

It is well known that deaf and hearing-impaired individuals often rely on lip reading and sign language interpretation, for example, to assist in understanding spoken communications. In many situations lip reading is difficult and does not, by itself, suffice. Likewise, sign language requires the presence of an interpreter who may not be readily available. In such instances, there have been various methods used to aid in comprehending the spoken communications. One of these methods is phonetic transcription. Phonetic transcription generally refers to the representation of perceived temporal segments of speech using the symbols of the International Phonetic Alphabet and is described in a commonly assigned and co-pending patent application Ser. No. 09/811,053, filed on Mar. 16, 2001 and entitled "Hierarchical Transcription and Display of Input Speech".

Automatic speech recognition (ASR) has also been conventionally employed as a communication tool to help comprehend spoken language. One problem with this tool, however, is that there is considerable delay between when a person speaks and when a speech recognition system translates and presents the decoded speech text. The relationship between what was said and the resulting recognized speech text is very important, at least in terms of verification and/or correction of the output from the ASR system. Because of the inherent delay which exists in the ASR system, a hearing-impaired user cannot completely ascertain the relationship between what was spoken and what was textually presented. Additionally, ASR is generally prone to errors in the decoded speech output.

Accordingly, there exists a need for techniques, for use by hearing-impaired or other persons, for improved comprehension of a particular utterance.

SUMMARY OF THE INVENTION

The present invention provides methods and apparatus for presenting images representative of an utterance with corresponding decoded speech. In combination with an automatic speech recognition (ASR) system, the present invention provides multiple sources of information for comprehending the utterance and allows a hearing-impaired person to quickly and easily ascertain the relationship between body movements (e.g., lip and/or mouth movements, hand and/or arms movements, etc.) used to represent the utterance and the corresponding decoded speech output from the ASR system. Using the techniques of the invention, therefore, a hearing-impaired person or other user may jointly utilize both the ASR system output, which may be prone to errors, and images of body movements corresponding to the decoded speech text, which is presumably not error prone. Thus, the invention has wide applicability, for example, for enhancing the accuracy of the ASR system by enabling a user to easily compare and verify the decoded speech text with images corresponding to the decoded speech text, or as a teaching aide to enable a user to develop lip reading and/or sign language skills.

In accordance with one aspect of the invention, a visual feature extractor captures and processes images of body movements (e.g., lip movements of a speaker or hand movements of a sign language interpreter) representing a given utterance. The visual feature extractor comprises a visual detector, for capturing the images of body movements, and an image preparator coupled to the visual detector. The image preparator processes the images from the visual detector and synchronizes the images with decoded speech from the ASR system. Using time information from the ASR system relating to starting and ending time intervals of a particular decoded word(s), the image preparator groups or separates the images into one or more image segments comprising a time sequence of images corresponding to each decoded word in the utterance.

In accordance with another aspect of the invention, a visual detector is operatively coupled with position detection circuitry for monitoring a position of the hearing-impaired user and detecting when the user has stopped viewing decoded speech text presented on a display screen. In conjunction with information from the ASR system, a visual indication is generated on the display screen identifying the user's place on the display screen to allow the user to quickly resume reading the decoded speech text.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention provides methods and apparatus for presenting images representing one or more words in a given utterance with corresponding decoded speech. In combination with an automatic speech recognition (ASR) system, or a suitable alternative thereof, the present invention provides multiple sources of information for comprehending the utterance. By coordinating the images representing a words (s) in the utterance with corresponding decoded speech, a hearing-impaired person or other user can quickly and easily ascertain the relationship between the images and the decoded speech text. Thus, the invention has wide application, for example, for enhancing the accuracy of the ASR system by enabling the user to compare and verify the decoded speech text with the images corresponding to the recognized text, or to assist the user in developing lip reading and/or sign language skills.

The present invention will be described herein in the context of illustrative lip reading and sign language assistant systems for respectively presenting images representative of an utterance with corresponding decoded speech text. It should be appreciated, however, that the present invention is not limited to this or any particular system for presenting images representative of a word(s) in an utterance. Rather, the invention is more generally applicable to any communication situation wherein it would be desirable to have images of body movements relating to a word(s) in an utterance recorded and synchronized with corresponding decoded speech.

Figure 1:
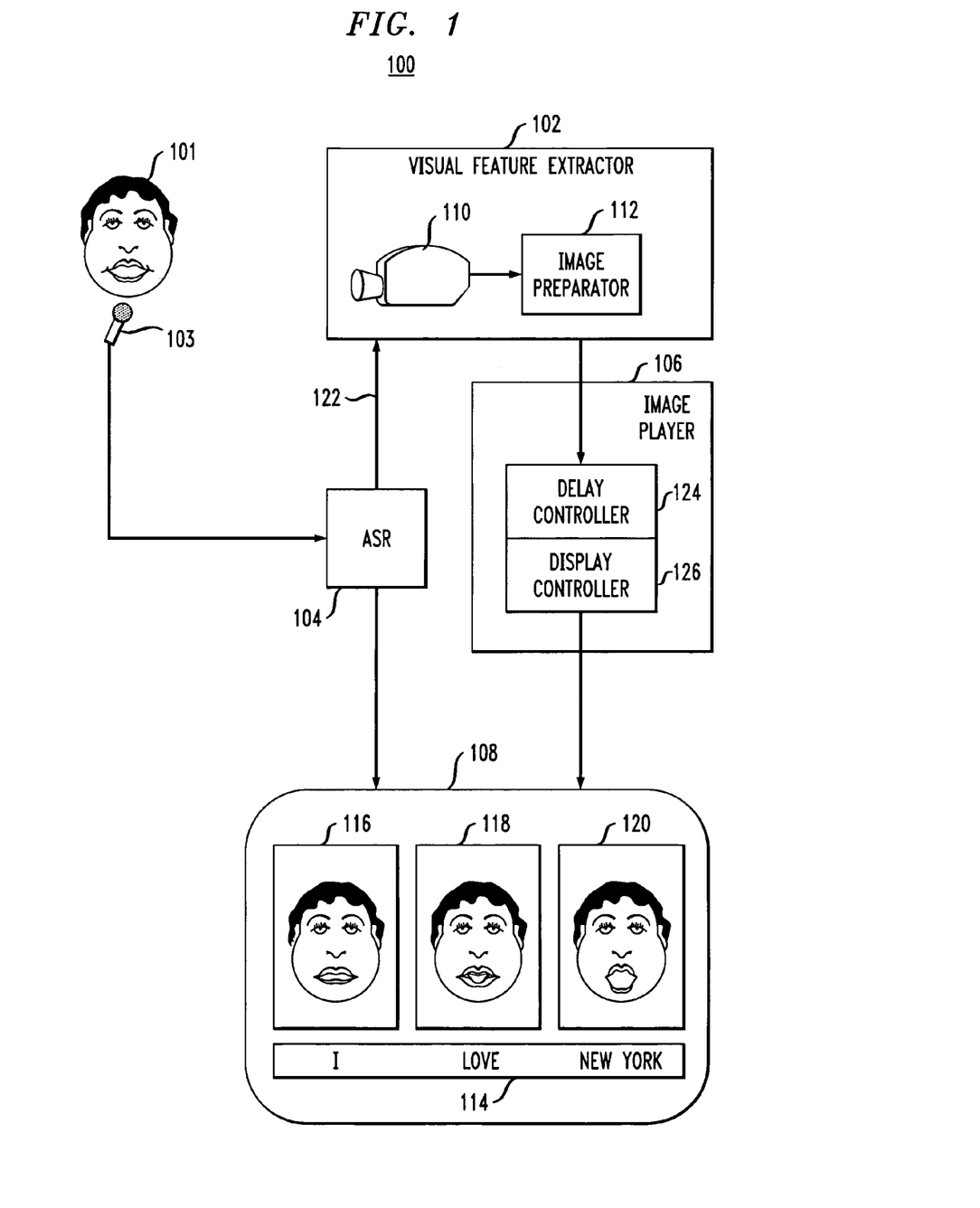
FIG. 1 is a general block diagram illustrating a lip reading assistant, formed in accordance with one aspect of the present invention.

Without loss of generality, FIG. 1 depicts a block diagram of an illustrative lip reading assistant 100, formed in accordance with one aspect of the invention. The lip reading assistant includes a visual feature extractor 102, an ASR engine 104, an image player 106 and a display or monitor 108. As will be appreciated by those skilled in the art, the ASR engine 104 includes an acoustic feature extractor for converting acoustic speech signals (e.g., captured by a microphone 103 or a suitable alternative thereof), representative of an utterance of a speaker 101, into a spectral feature vector set associated with that utterance, and subsequently decoding the spectral feature vector set into a corresponding textual speech output. The ASR engine 104 is operatively connected to the display 108 for visually indicating the decoded textual speech to a hearing-impaired user. Commercially available ASR engines suitable for use with the present invention are known by those skilled in the art.

Consistent with the acoustic feature extractor in the ASR engine 104 for converting acoustic speech into a spectral feature vector set, the visual feature extractor 102 preferably records lip and mouth movements (and any other facial expressions deemed helpful in further comprehending an utterance) generated by an utterance of a speaker 101 and preferably extracts certain characteristics of these movements as a facial feature vector set. These characteristics may include, for example, lip/mouth position, tongue position, etc. The facial features are ideally extracted simultaneously with the acoustic feature extraction operation and are subsequently synchronized with corresponding decoded speech text so that the relationship between lip movements and decoded text can be easily determined by a user. This is advantageous as an aid for lip reading or as a verification of the speech recognition mechanism, among other important and useful functions.

As shown in FIG. 1, the visual feature extractor 102 preferably includes an image detector 110, such as, for example, a digital or video camera, charge-coupled device (CCD), or other suitable alternative thereof, for capturing images or clips (i.e., a series of successive images in time) of lip movements, sampled at one or more predetermined time intervals, generated by a given speech utterance. The captured images are preferably processed by an image preparator 112 included in the visual feature extractor 102 and coupled to the image detector 110. Image preparator 112 may include a video processor (not shown), such as, for example, a frame grabber or suitable alternative thereof, which can sample and store a digital representation of an image frame(s), preferably in a compressed format. It is to be appreciated that, in accordance with the invention, the visual feature extractor 102 may simply function as a buffer, to delay the captured images so that the images can be presented (e.g., played back) synchronized with the inherently delayed recognition text output from the ASR engine 104.

Image preparator 112, like the ASR engine 104, may be implemented in accordance with a processor, a memory and input/output (I/O) devices (not shown). It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "user interface" as used herein is intended to include, for example, one or more input devices (e.g., keyboard, mouse, etc.) for entering data to the processor, and/or one or more output devices (e.g., printer, monitor, etc.) for presenting the results associated with the processor. The user interface may also include at least a portion of the visual feature extractor 102, such as, for example, the camera for receiving image data.

Accordingly, an application program, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor. In any case, it is to be appreciated that the components shown in FIG. 1 may be implemented in various forms of hardware, software, or combinations thereof.

The image preparator 112 includes an input for receiving captured image data from the image detector 110 and an output for displaying an image or animation of two or more images (e.g., at a frame rate of 30 Hz) corresponding to a word(s) in the utterance. The image preparator 112 is preferably capable of at least temporarily storing (e.g., in memory associated therewith) captured images and parsing or segmenting the images into one or more corresponding words in the utterance, as will be described in more detail herein below. It is to be appreciated that an image animation may depict merely lip/mouth movements or it may depict entire facial expressions as well (or any amount of detail there between). Moreover, the captured images may be digitized and converted so that only an outline of the lip or face is shown (e.g., contouring). Each of these images has time information associated therewith which can be subsequently used to synchronize a particular image or animation with the decoded speech text from the ASR engine 104. To accomplish this, time information pertaining to the corresponding decoded speech text is obtained from the ASR engine 104, which typically provides such capability. A connection 122 from the ASR engine 104 to the visual feature extractor 102 is included for the purpose of obtaining such time data.

The image player 106 is operatively coupled to the visual feature extractor 102 and functions, at least in part, to present the images associated with a particular word or words of a given utterance in combination with the corresponding decoded speech text, preferably on a monitor or display 108 connected to the image player. The display 108 may include, for example, a CRT display, LCD, etc. Furthermore, the present invention contemplates that stereoglasses, or a suitable alternative thereof, may be employed as the display 108 for viewing facial movements of the speaker in three dimensions. Image player 106 preferably repeatedly displays or "plays" an image animation in a separate area or window on the display 108. The image animation, which may be comprised of successive time-sequenced images, may be repeated such as by looping on the images corresponding to a particular word(s). The image player 106 may also operatively control the speed at which the images comprising the animation clip are repeatedly played, whereby a user can, for instance, selectively slow down or speed up the image animation sequence (compared to real time) for a particular word(s) of the utterance as desired. In applications wherein it is desired to merely synchronize captured images with the recognized speech text, the image player 106 may simply present a stream of images, buffered by a predetermined delay, with the corresponding decoded speech text from the ASR engine 104.

Each image animation is preferably displayed in close relative proximity to its corresponding decoded speech text, either in a separate text window 114 or in the same window as the image animation. In this manner, a user can easily ascertain the relationship between the images of facial movements and the decoded speech text associated with a particular utterance or portion thereof. One skilled in the art will appreciate that the image player 106 may be incorporated or integrated with the visual feature extractor 102, in which case the output of the visual feature extractor 102 can be coupled directly to the display 108.

By way of example only, FIG. 1 shows a display 108 including three separate image windows 116, 118 and 120 for displaying animated images of facial movements corresponding to an utterance "I love New York," along with a text window 114 below the image windows for displaying the corresponding decoded textual speech of the utterance. Display window 116 corresponds to the word "I," window 118 corresponds to the word "love" and window 120 corresponds to the words "New York." As discussed herein above, the animated images of facial movements are preferably repeatedly displayed in their respective windows. For example, window 116 displays animated images of facial movements repeatedly mouthing the word "I, I, I, . . ." Window 118 displays animated images of facial movements repeatedly mouthing the word "love, love, love, . . ." Likewise, window 120 constantly displays animated images of facial movements repeatedly mouthing the words "New York, New York, New York . . ." The decoded speech text corresponding to each of the words is clearly displayed below each image window 116, 118, 120 in text window 114. It is to be appreciated that the decoded speech text may be displayed in any suitable manner in which it is clear to the user which image animation corresponds to the particular decoded speech text.

The illustrative lip reading assistant 100 may include a display controller 126. The display controller 126 preferably generates a control signal which allows a user to control one or more aspects of the lip reading assistant 100 and/or characteristics of the manner in which an image animation is displayed in relation to its corresponding text. For example, the display controller 126 may allow the user to modify the number of windows displayed on the screen, the size/shape of the windows, the appearance of the corresponding decoded speech text displayed on the monitor 108, etc.

Figure 2:
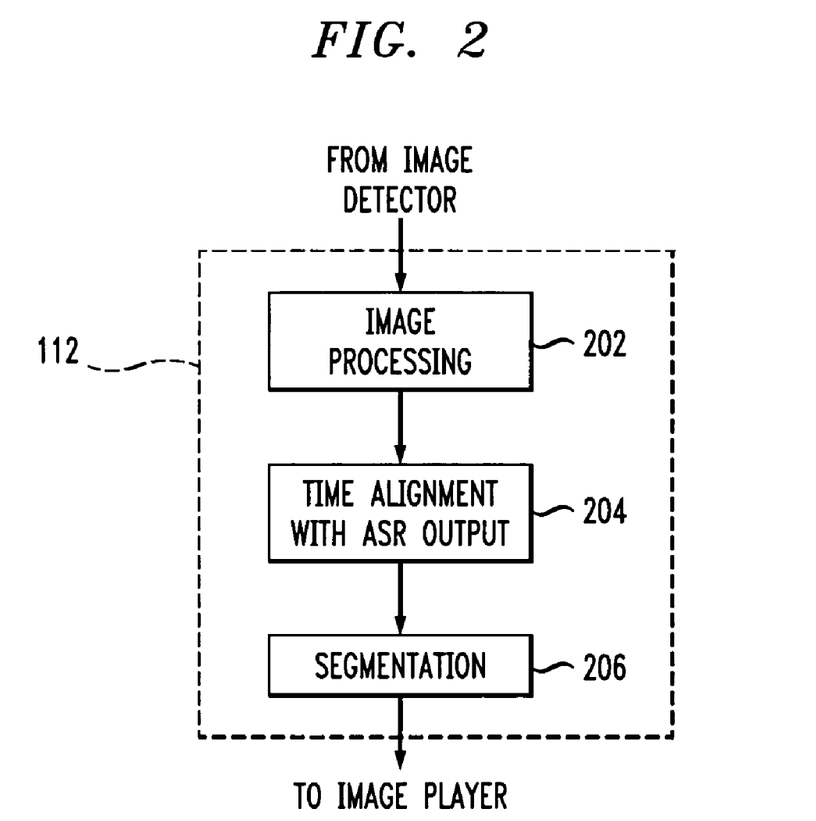
FIG. 2 is a logical flow diagram illustrating a preparator of images module, formed in accordance with the invention.

With reference now to FIG. 2, a logical flow diagram is shown which depicts functional blocks or modules of an illustrative image preparator 112, in accordance with one aspect of the invention. As shown in FIG. 2, the illustrative image preparator 112 includes an image processing module 202 which receives image data from the image detector and processes the image data in a predetermined manner. As described herein above, the image processing may include, for example, capturing certain facial movements (e.g., lip and/or mouth movements) associated with a word(s) of an utterance in the form of animated images. The captured images are preferably digitized and compressed in accordance with a standard compression algorithm, as understood by those skilled in the art, and stored along with time information relating to when the image was sampled. Image processing which may be suitable for use with the present invention is described, for example, in commonly assigned and co-pending patent application Ser. No. 09/079,754 filed on May 15, 1998 and entitled "Apparatus and Method for User Recognition Employing Behavioral Passwords", which is incorporated herein by reference.

A time alignment module 204 included in the image preparator 112 time-aligns or synchronizes the recorded images of facial movements with the output of the decoded speech text from the ASR engine. Since both the image and the corresponding decoded speech text include time information associated therewith, the time-alignment preferably involves matching the time information for a particular decoded speech text with the time information for an image or animation, which may correspond to an interval of time. As discussed above, both the ASR engine and the visual feature extractor include the ability to attach time information to decoded speech text and captured images of facial movements, respectively. A more detailed description of an exemplary time alignment technique, in accordance with one aspect of the invention, is provided herein below with reference to FIG. 3.

With continued reference to FIG. 2, the image preparator 112 also includes a segmentation module 206. The segmentation module functions, at least in part, to segment the stored images of recorded facial movements into one or more clips which, when displayed in succession, produce an image animation relating to a particular word(s) in a given utterance. The segmentation may be performed using, for example, the time information corresponding to a particular word(s). These image segments, which may be considered analogous to the spectral feature vector set generated by the ASR engine, are then sent to the image player which repeatedly plays each of these segments, as described herein above.

Figure 3:
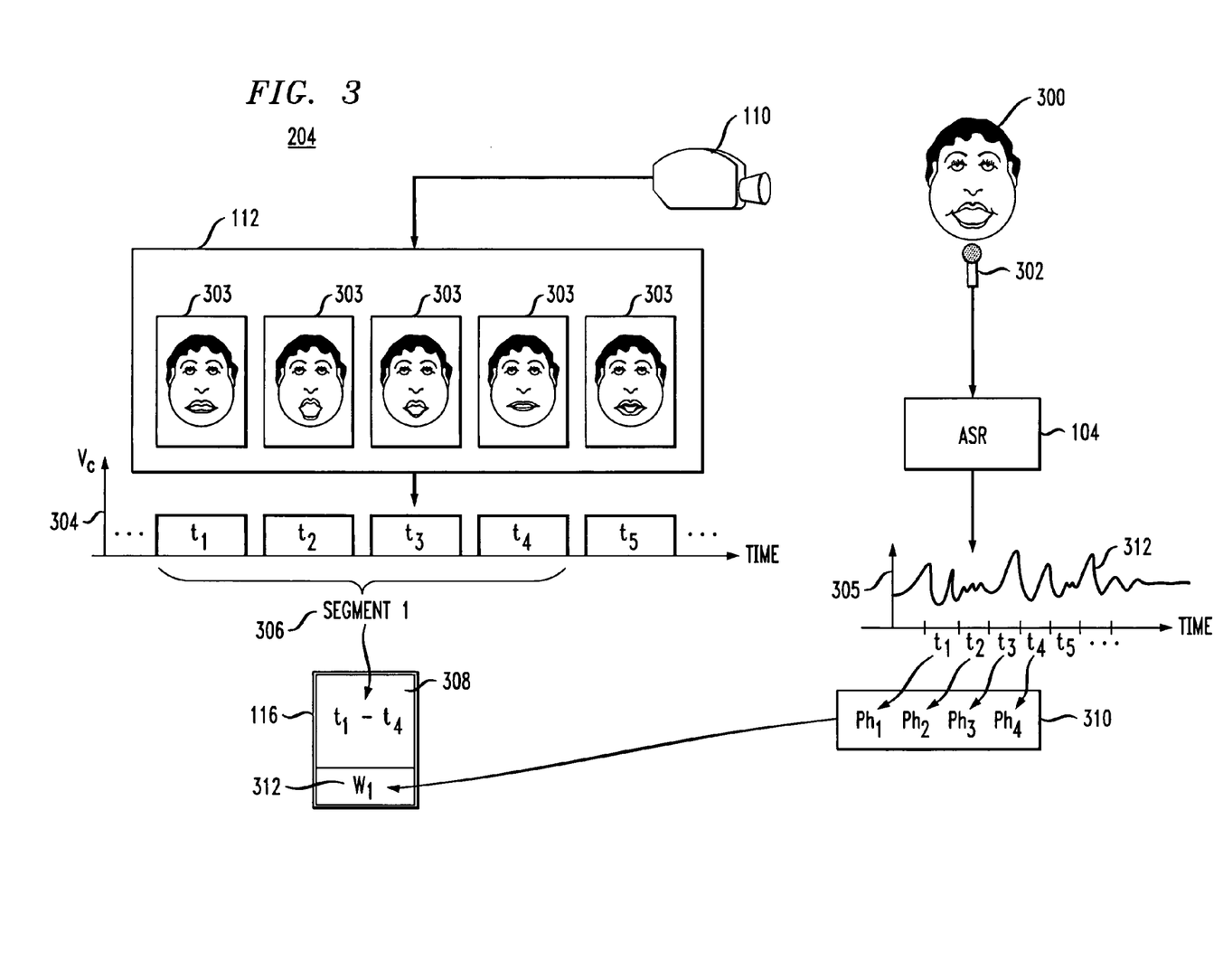
FIG. 3 is a graphical representation illustrating a time alignment technique, in accordance with the invention.

FIG. 3 depicts an illustrative time alignment technique according to one aspect of the present invention. With reference to FIG. 3, camera 110 captures facial movements of a speaker 300, which primarily includes lip and/or mouth movements, as a series of images 303 corresponding to a given utterance. The images 303 are preferably generated by the image processing module (202 in FIG. 2), e.g., as part of a visual feature extraction operation, included in the image preparator 112 and stored in memory. Each image 303 corresponds to a predetermined time interval $t_1, t_2, t_3, t_4, t_5, \ldots$ (e.g., one second) based upon a reference clock 304 which is preferably generated internally by the image preparator 112. Therefore, a first image 303 corresponds to interval $t_1$, a second image 303 corresponds to interval $t_2$, and so on. Alternatively, the present invention contemplates that reference clock 304 may be generated externally to the image preparator 112, such as by a global system clock.

Concurrently with the visual feature extraction, an audio detector, such as, for example, a microphone 302 or other suitable audio transducer, captures an acoustic speech signal 312 corresponding to the utterance of speaker 300. The acoustic speech signal 312 is fed to and processed by the ASR engine 104 where it is operatively separated into respective phonemes. Each phoneme is represented by a predetermined time interval $t_1$, $t_2$, $t_3$, etc. based on a reference clock 305 which may be generated either internally by the ASR engine 104 or externally to the ASR engine. A technique for representing phonemes with a time is described, for example, in U.S. Pat. No. 5,649,060 to Ellozy et al. entitled "Automatic Indexing and Aligning of Audio and Text Using Speech Recognition," which is incorporated herein by reference. Preferably, reference clocks 304 and 305 originate from the same source (e.g., a global system clock) or are at least substantially aligned with each other. If the reference clocks 304, 305 are offset from each other, the time alignment operation will likewise be offset. Phoneme $Ph_1$ corresponds to time interval $t_1$, phoneme $Ph_2$ corresponds to time interval $t_2$, phoneme $Ph_3$ corresponds to time interval $t_3$, and so on. It is to be appreciated that a same phoneme may be related to more than one time interval, just as the same word (e.g., "the") may be used more than once in a given sentence. For example, phoneme $Ph_1$ may be the same as phoneme $Ph_3$, only during different time intervals, namely, $t_1$ and $t_3$, respectively.

With continued reference to FIG. 3, the ASR engine 104 operatively matches a group of phonemes 310 and outputs textual speech corresponding to the phonemes. By way of example only, a decoded word $W_1$ is comprised of phonemes $Ph_1$, $Ph_2$, $Ph_3$ and $Ph_4$. These phonemes relate to time intervals $t_1$ through $t_4$, respectively. Once the starting and ending time intervals ("time ends") for a particular word are known (e.g., from the time information generated by the ASR engine 104), the images relating to those time intervals can be grouped accordingly by the image preparator 112 into a corresponding image segment 306.

For instance, knowing that time intervals $t_1$ through $t_4$ represent decoded word $W_1$, the images 303 relating to time intervals $t_1$ through $t_4$ are grouped by the image preparator 112 into image segment 1 306 corresponding to word $W_1$. Since the time intervals $t_1$ through $t_4$ associated with the decoded word $W_1$ are ideally the same as the time intervals associated with an image segment 306, the images and corresponding decoded speech text are considered to be time-aligned. Ultimately, an animation comprising image segment 306 is preferably displayed in an image portion 308 of a separate display window 116, with the corresponding decoded speech text $W_1$ displayed in a text portion 312 of the window 116.

Referring again to FIG. 1, it is to be appreciated that before sending the images and corresponding decoded speech text to the display 108, the image player 106 may selectively control a delay between the visual (e.g., image animation) and corresponding textual (e.g., decoded speech text) representations of the decoded word(s) of an utterance in response to a control signal. The control signal may be generated by the display controller 126, described previously herein. For this purpose, the image player 106 may include a delay controller 124, or a suitable alternative thereof, operatively coupled between the image preparator 112 and the display 108. The delay controller 124 may be implemented by various methodologies known to those skilled in the art, including a tapped delay line, etc. Furthermore, it is contemplated by the present invention that the delay controller 124 may be included in the visual feature extractor 102, for example, as part of the time alignment operation, for providing the user with the ability to selectively control the time synchronization of the image animations from the image preparator 112 and corresponding decoded speech text from the ASR engine 104. By way of example only, the delay controller 124, in accordance with the invention, may display the image animation a predetermined amount of time prior to the display of the corresponding decoded speech text, or vice versa, as desired by the user.

Figure 4:
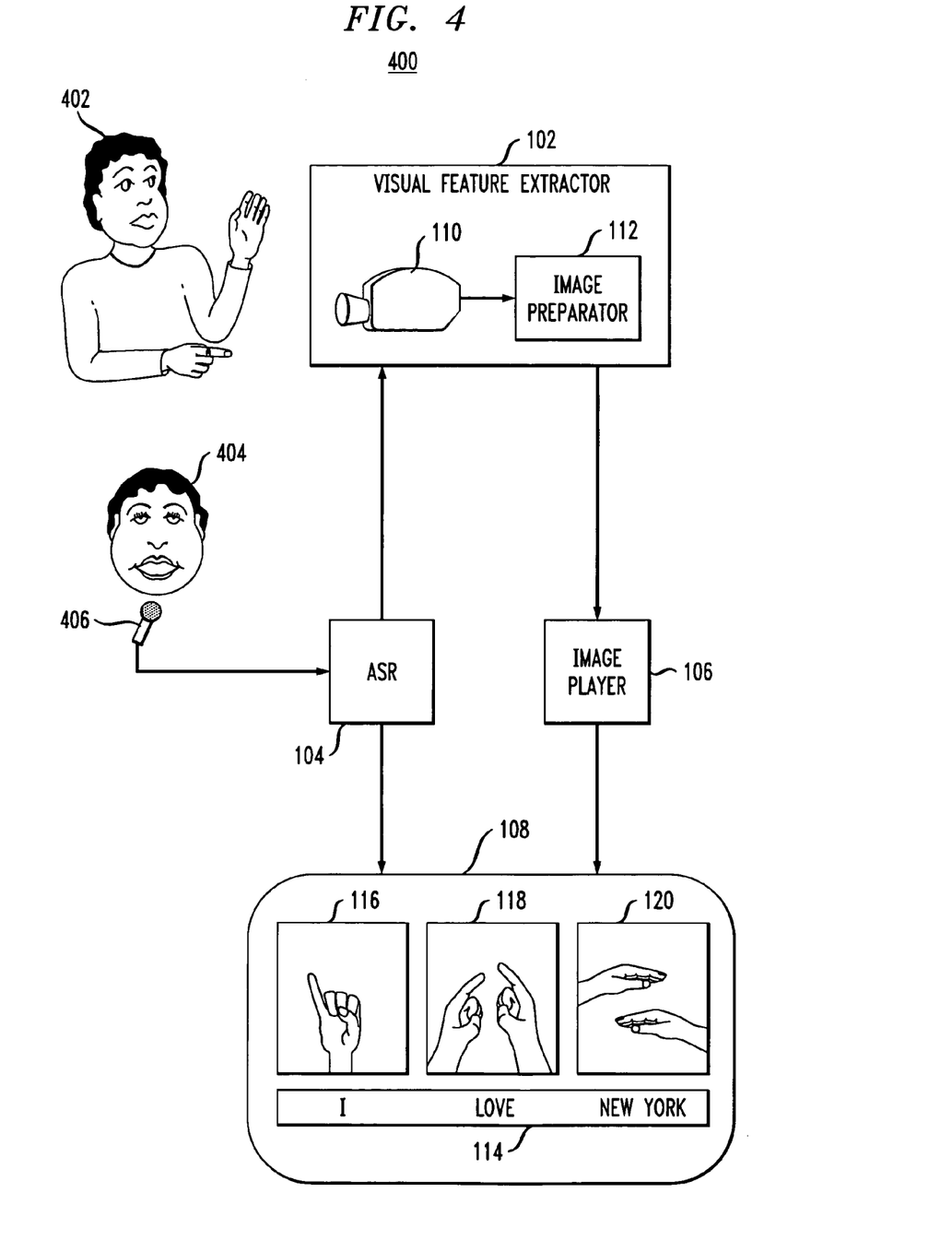
FIG. 4 is a graphical representation illustrating a sign language assistant, formed in accordance with another aspect of the present invention.

FIG. 4 illustrates a sign language assistant 400 formed in accordance with another aspect of the invention. In this illustrative embodiment, the sign language assistant 400 may be used to repeatedly display animated hand and arms movements, as is typically used in sign language interpretation, in a separate display window along with its corresponding decoded speech text, in a manner consistent with that described herein above for recording facial movements relating to a given utterance. Rather than recording the facial movements of a speaker, a visual detector 110, such as, for example, a digital or video camera, CCD, etc., captures images of body movements of a sign language interpreter 402 who is translating, essentially in real time, the utterances of a speaker 404. The body movements captured by the visual detector 110 are primarily comprised of hand and arm movements typically used to convey a sign language translation of speech.

Analogous to the lip reading assistant described in connection with FIG. 1, the illustrative sign language assistant 400 includes a visual feature extractor 102, an ASR engine 104, an image player 106 and a display 108. The operation of these functional modules is consistent with that previously explained herein. While the ASR engine 104 captures acoustic speech signals corresponding to an utterance(s) of a speaker 404 (e.g., by way of a microphone transducer 406 coupled to the ASR engine), the visual detector 110 captures hand and/or arm movements of the sign language interpreter 402 to be processed by the image preparator 112.

It is to be appreciated that any inherent delay in the sign language translation can be modified or eliminated, as desired, in a time alignment operation performed by the image preparator 112. As previously explained, for example, in conjunction with FIG. 3, the time alignment operation employs time information associated with the decoded speech text obtained from the ASR engine 104 and time information associated with the corresponding recorded images of hand/arm movements to operatively control the delay between the image animation of hand/arm movements and the corresponding decoded speech text for a word(s) in a given utterance.

In the exemplary sign language assistant 400 shown in FIG. 4, images of hand movements are presented in separate image windows 116, 118, 120 on the display 108. These images are preferably rendered as a repeated animation, such as by looping on a time sequence of successive images associated with a particular words(s) in the utterance. Similarly, decoded speech text is preferably displayed in a separate text window 114 in close relative proximity to an image window corresponding to the particular image animation. By way of example only, the text, "I love New York," is displayed in text window 114 below image windows 116, 118, 120, with each image window displaying sign language hand movements for its corresponding word(s) (e.g., text window 114 displays the word "I", while the corresponding image window 116 displays hand movements presenting the word "I" in sign language). In accordance with the principals set forth herein, the present invention contemplates that the method thus described may be employed for teaching sign language.

Figure 5:
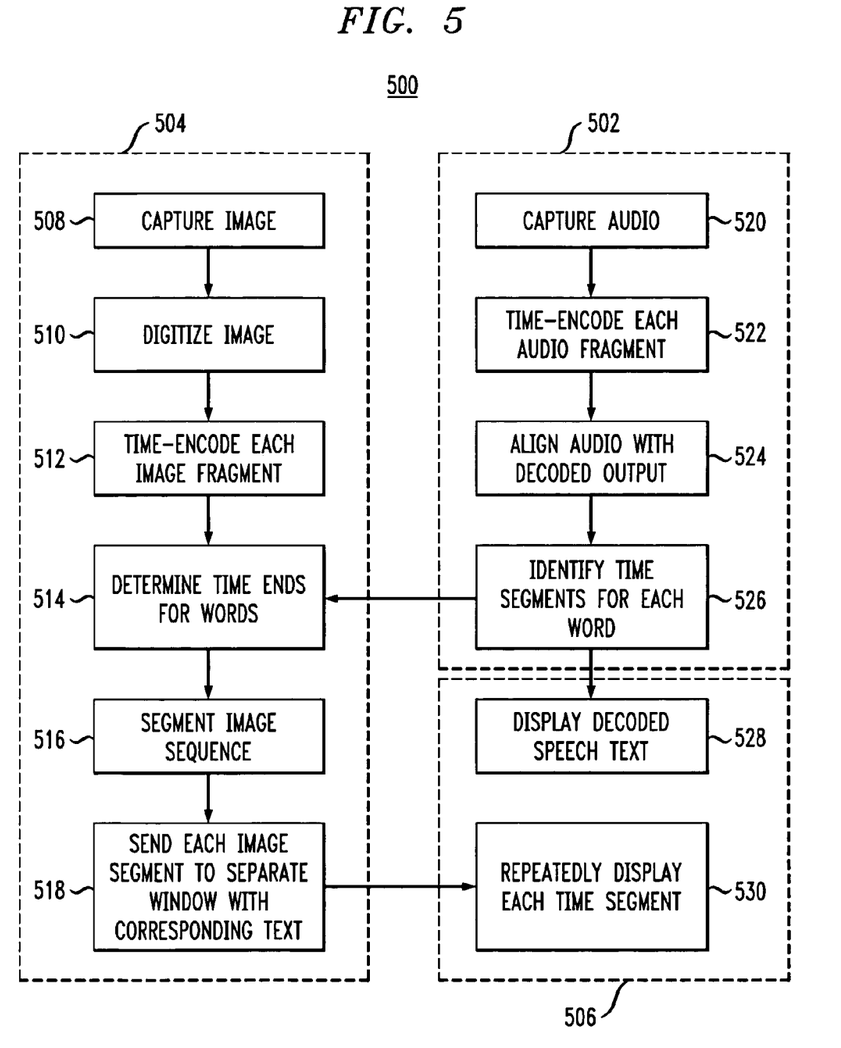
FIG. 5 is a logical flow diagram illustrating a method for presenting images representative of an utterance with corresponding decoded speech, in accordance with one aspect of the invention.

With reference now to FIG. 5, a logical flow diagram is depicted illustrating a method 500 of presenting images representing one or more words in an utterance with corresponding decoded speech, in accordance with one aspect of the invention. For ease of explanation, the steps performed can be divided into more general functional modules or blocks, including an audio block 502, an image block 504 and a display block 506. The visual block 504 represents the methodologies performed by the visual feature extractor (102) and image player (106), the audio block 502 represents the methodologies performed by the ASR engine (104), and the display block 506 represents the display (108), as previously explained herein with reference to FIG. 1.

In the illustrative methodology of image block 504, a plurality of images representing facial (e.g., lips and/or mouth) movements, or other body movements (e.g., hand and/or arm movements), of a speaker are captured in block 508 and digitized in block 510. Each digitized image is encoded with a time in block 512 identifying when the respective image was captured. In a time alignment operation, using information regarding the time intervals associated with a particular word(s) of decoded speech text obtained from an ASR engine, time ends for a sequence of images representing a corresponding word are determined in block 514. The time ends are utilized to segment the image sequence in block 516 according to distinct words, as identified by the ASR engine. Once the images are grouped into segments corresponding to the decoded speech text, each image segment is preferably subsequently sent to block 518 to be repeatedly presented, e.g., in a separate image window on the display in block 530, along with its corresponding speech text in block 528.

With continued reference to FIG. 5, in order to determine the time ends in block 514 for each word in the utterance, the ASR engine performs an audio processing operation, as depicted by audio block 502, substantially in parallel with the image processing in image block 504. In the illustrative methodology of audio block 502, an audio (acoustic speech) signal representing an utterance of the speaker is captured in block 520 and preferably stored (e.g., in memory included in the system). The speech signal is then separated into audio fragments (phonemes) which are time-encoded in block 522 by the ASR engine. Next, the audio is aligned or matched with a decoded speech output in block 524. This allows the ASR engine to identify time intervals or segments corresponding to each word in the utterance in block 526. This time information is subsequently used by the image block 504 to determine the time ends in block 514 for aligning the captured images with its corresponding decoded speech text.

Figure 6:
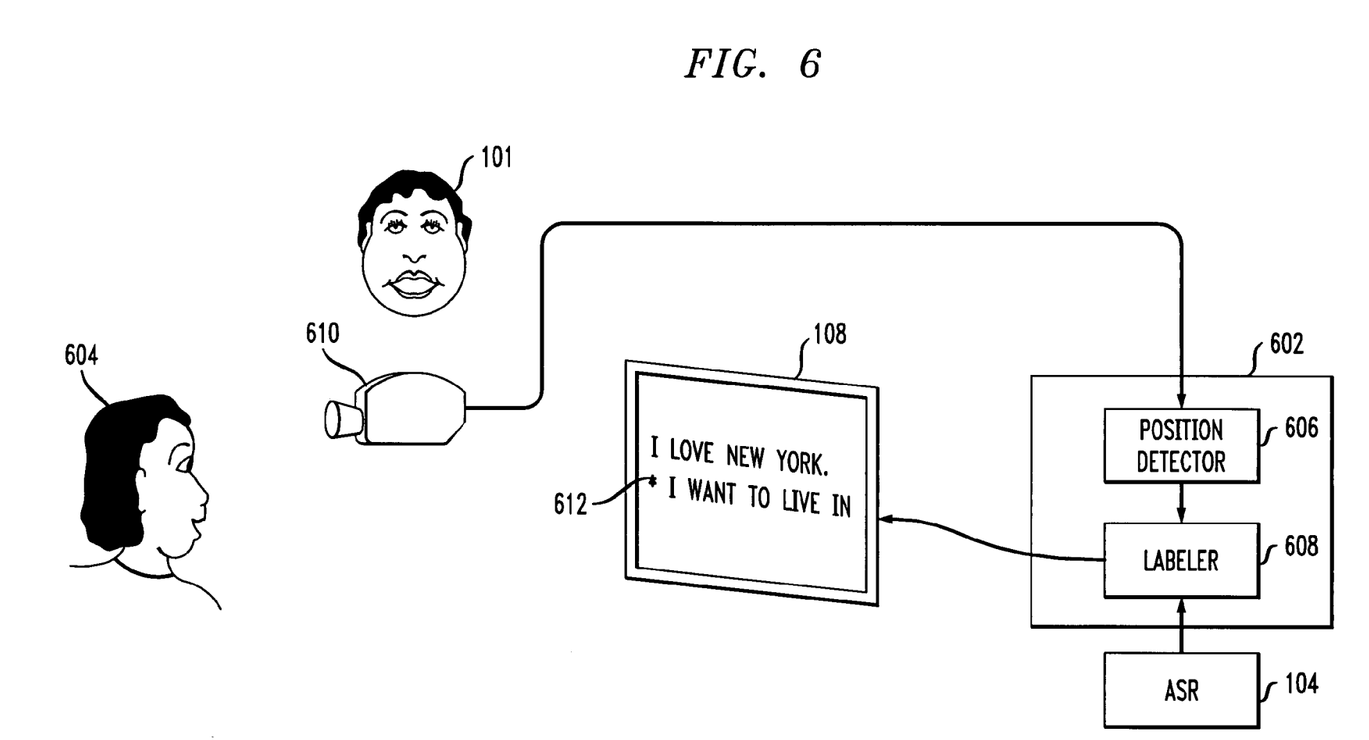
FIG. 6 is a graphical representation illustrating a mechanism for labeling an onset of a decoded speech output, formed in accordance with one aspect of the invention.

With reference now to FIG. 6, another aspect of the present invention will be explained which may be employed in combination with the lip reading and/or sign language assistant techniques described herein. In the illustrative embodiment of FIG. 6, a lip reading/sign language assistant 600 includes a recognition module 602 coupled to a visual detector 610, such as, for example, a digital or video camera, CCD, etc., for monitoring a position of a user 604, such as a hearing-impaired person (e.g., determining when the user has stopped viewing an object, such as display 108). For instance, the user 604 may stop viewing the display 108 in order to observe the speaker 101 from time to time. When the user resumes observing the display 108, there is frequently time lost in trying to identify the user's place on the display screen.

To help solve this problem, the recognition module 602 operatively generates a visual indication 612 on the display 108 in response to an onset of when the user has stopped viewing the display. This visual indication 612 may be, for example, in the form of a display graphic or icon, highlighted or flashing text, change of color, etc. By searching the display screen for the visual indication 612, the user can easily identify where on the display screen he or she last left off, and therefore quickly resume reading the decoded textual speech and/or corresponding images being displayed.

With continued reference to FIG. 6, recognition module 602 preferably includes a position detector 606 coupled to a label generator 608. The position detector 606 receives a visual signal, representing image information from the visual detector 610 which is coupled thereto, and generates a control signal for use by the label generator 608 in response to the visual signal. The visual detector 610 functions consistent with the visual detector (110) described above, only visual detector 610 is positioned for capturing image information of the user 604, rather than of the speaker 101. Preferably, position detector 606 includes circuitry which compares a position of the user 604 (e.g., extracted from the received visual signal) with reference position data (e.g., stored in memory included in the system) and generates a control signal indicating whether or not the user's body position falls within a predetermined deviation from the reference position data. A technique for detecting the position of a person which is suitable for use with the present invention is presented, for example, in commonly assigned and co-pending patent application Ser. No. 09/079,754, filed on May 15, 1998 and entitled "Apparatus and Method for User Recognition Employing Behavioral Passwords", which is incorporated herein by reference.

Label generator 608 receives a control signal produced by the position detector 606 and outputs a visual indication 612 to be displayed on display 108 in response thereto. As stated above, the visual indication 612 may include a display graphic or icon (e.g., a star), or it may modify one or more characteristics of the display screen and/or displayed speech text, such as, for example, highlighting or flashing a portion of the screen, changing the font, color or size of the displayed text, etc. In order to mark or identify where in the stream of displayed speech text the user first stopped viewing the display, the label generator is coupled to and receives data from the ASR engine 104. When the label generator 608 receives a control signal indicating that the user is no longer viewing the display, the label generator preferably attaches the visual indication to the decoded speech text data.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. Apparatus for presenting images representative of one or more words in an utterance with corresponding decoded speech, the apparatus comprising:

a visual detector, the visual detector capturing images of body movements substantially concurrently from the one or more words in the utterance;

a visual feature extractor coupled to the visual detector, the visual feature extractor receiving time information from an automatic speech recognition (ASR) system and operatively processing the captured images into one or more image segments based on the time information relating to one or more words, decoded by the ASR system, in the utterance, each image segment comprising a plurality of successive images in time corresponding to a decoded word in the utterance; and an image player operatively coupled to the visual feature extractor, the image player receiving and presenting decoded word with each image segment generated therefrom;

wherein the image player repeatedly presents one or more image segments with the corresponding decoded word by looping on a time sequence of successive images correspondina to the decoded word, wherein the image player displays each image segment in a separate window on a display in close proximity to the decoded speech text corresponding to the image segment.

2. The apparatus of claim 1, further comprising:
a delay controller operatively coupled to the visual feature extractor, the delay controller selectively controlling a delay between an image segment and a corresponding decoded word in response to a control signal.

3. The apparatus of claim 1, further comprising:
a visual detector for monitoring a position of a user;
a position detector coupled to the visual detector, the position detector comparing the position of the user with a reference position and generating a control signal, the control signal being a first value when the position of the user is within the reference area and being a second value when the position of the user is not within the reference area;
a label generator coupled to the position detector, the label generator displaying a visual indication on a display in response to the control signal from the position detector.

4. The apparatus of claim 3, wherein the label generator receives information from the ASR system, the label generator using the information from the ASR system to operatively position the visual indication on the display.

5. The apparatus of claim 1, wherein the body movements include at least one of lip movements of the speaker, mouth movements of the speaker, hand movements of a sign interpreter of the speaker, and arm movements of the sign interpreter of the speaker.

6. The apparatus of claim 1, further comprising:
a display controller, the display controller selectively controlling one or more characteristics of a manner in which the image segments are displayed with corresponding decoded speech text.

7. The apparatus of claim 6, wherein the display controller operatively controls at least one of a number of times an image segment animation is repeated, a speed of image animation, a size of an image segment on a display, a position of an image segment on the display, and a start time to process a next image segment.

8. Apparatus for presenting images representative of one or more words in an utterance with corresponding decoded speech, the apparatus comprising:
an automatic speech recognition (ASR) engine for converting the utterance into one or more decoded words, the ASR engine generating time information associated with each of the decoded words;

a visual detector, the visual detector capturing images of body movements substantially concurrently from one or more words in the utterance;

a visual feature extractor coupled to the visual detector, the visual feature extractor receiving the time information from the ASR engine and operatively processing the captured images into one or more image segments based on the time information relating to the decoded words, each image segment comprising a plurality of successive images in time corresponding to a decoded word in the utterance; and an image player operatively coupled to the visual feature extractor, the image player receiving and presenting the decoded word with each image segment generated therefrom;

wherein the image player repeatedly presents one or more image segments with the corresponding decoded word by looping on a time sequence of successive images corresponding to the decoded word, wherein the image player displays each image segment in a separate window on a display in close proximity to the decoded speech text corresponding to the image segment.

9. The apparatus of claim 8, further comprising:
a delay controller operatively coupled to the visual feature extractor, the delay controller selectively controlling a delay between an image segment and a corresponding decoded word in response to a control signal.

10. A method for presenting images representative of one or more words in an utterance with corresponding decoded speech, the method comprising the steps of:
capturing a plurality of images representing body movements substantially concurrently from the one or more words in the utterance;
associating each of the captured images generated from the one or more words in the utterance with time information relating to an occurrence of the image;
receiving, from an automatic speech recognition (ASR) system, data including a start time and an end time of a word decoded by the ASR system;
aligning the plurality of images into one or more image segments according to the start and stop times received from the ASR system, wherein each image segment corresponds to a decoded word in the utterance; and
presenting the decoded word with the corresponding image segment generated therefrom;
wherein the step of presenting the decoded word with the correspondina image segment generated therefrom comprises repeatedly looping on a time sequence of successive images corresponding to the decoded word, wherein the step of presenting displays each image segment in a separate window on a display in close proximity to the decoded speech text corresponding to the image segment.

11. The method of claim 10, further comprising the step of:
selectively controlling a delay between when an image segment is presented and when a decoded word corresponding to the image segment is presented.

12. The method of claim 10, further comprising the step of:
selectively controlling a manner in which an image segment is presented with a corresponding decoded word.

13. The method of claim 10, further comprising the steps of:
monitoring a position of a user;
comparing the position of the user with a reference position and generating a control signal having a first value when the position of the user is within the reference position and a second value when the position of the user is outside of the reference position; and presenting a visual indication on a display screen in response to the control signal.

14. The method of claim 10, wherein the step of aligning the plurality of images comprises:

comparing the time information relating to the captured images with the start and stop times for a decoded word; and determining which of the plurality of images occur within a time interval defined by the start and stop times of the decoded word.

15. In an automatic speech recognition (ASR) system for converting an utterance of a speaker into one or more decoded words, a method for enhancing the ASR system comprising the steps of:

capturing a plurality of successive images in time representing body movements substantially concurrently from one or more words in the utterance;

associating each of the captured images generated from the one or more words in the utterance with time information relating to an occurrence of the image;

obtaining, from the ASR system, time ends for each decoded word in the utterance;

grouping the plurality of images into one or more image segments based on the time ends, wherein each image segment corresponds to a decoded word in the utterance; and presenting the decoded word with the corresponding image segment generated therefrom;

wherein the step of presenting the decoded word with the corresponding image segment generated therefrom comprises repeatedly looping on a time sequence of successive images corresponding to the decoded word, wherein the step of presenting displays each image segment in a separate window on a display in close proximity to the decoded speech text corresponding to the image segment.

16. The method of claim 15, wherein the step of obtaining time ends for a decoded word from the ASR system comprises determining a start time and a stop time associated with the decoded word.

17. The method of claim 15, wherein the step of grouping the plurality of images into image segments comprises:

comparing the time information relating to the captured images with the time ends for a decoded word; and determining which of the plurality of images occur within a time interval defined by the time ends of the decoded word.

18. The method of claim 15, wherein the body movements captured in the images include at least one of lip movements of the speaker, mouth movements of the speaker, hand movements of a sign interpreter of the speaker, and arm movements of the sign interpreter of the speaker.

19. A method for presenting images representative of one or more words in an utterance with corresponding decoded speech, the method comprising the steps of:

providing an automatic speech recognition (ASR) engine;

decoding, in the ASR engine, the utterance into one or more words, each of the decoded words having a start time and a stop time associated therewith;

capturing a plurality of images representing body movements substantially concurrently from the one or more words in the utterance;

buffering the plurality of images by a predetermined delay;

receiving, from the ASR engine, data including the start time and the end time of a decoded word;

aligning the plurality of images into one or more image segments according to the start and stop times received from the ASR engine, wherein each image segment corresponds to a decoded word in the utterance; and presenting the decoded word with the corresponding image segment generated therefrom;

wherein the step of presenting the decoded word with the corresponding image segment generated therefrom comprises repeatedly looping on a time sequence of successive images corresponding to the decoded word, wherein the step of presenting displays each image segment in a separate window on a display in close proximity to the decoded speech text corresponding to the image segment.

* * * * *